United States Patent
Crane et al.

(10) Patent No.: US 7,069,221 B2
(45) Date of Patent: Jun. 27, 2006

(54) NON-TARGET BARGE-IN DETECTION

(75) Inventors: Matthew D. Crane, Charlestown, MA (US); Mark Arthur Holthouse, Newtonville, MA (US); John Ngoc Nguyen, Arlington, MA (US); Michael Stuart Phillips, Belmont, MA (US); Stephen Richard Springer, Needham, MA (US)

(73) Assignee: SpeechWorks International, Inc.

( * ) Notice: Subject to any disclaimer, the term of this patent is extended or adjusted under 35 U.S.C. 154(b) by 352 days.

(21) Appl. No.: 10/014,300

(22) Filed: Oct. 26, 2001

(65) Prior Publication Data

US 2003/0083874 A1 May 1, 2003

(51) Int. Cl.
*G10L 21/00* (2006.01)
*G10L 15/20* (2006.01)

(52) U.S. Cl. ...................... 704/275; 704/233
(58) Field of Classification Search ................ 704/275, 704/1, 231
See application file for complete search history.

(56) References Cited

U.S. PATENT DOCUMENTS

| | | | |
|---|---|---|---|
| 5,652,828 A * | 7/1997 | Silverman | .......... 704/260 |
| 5,765,130 A | 6/1998 | Nguyen | |
| 5,956,675 A * | 9/1999 | Setlur et al. | ........... 704/231 |
| 6,018,711 A | 1/2000 | French-St. George et al. | |
| 6,098,043 A * | 8/2000 | Forest et al. | ........... 704/270 |
| 6,246,986 B1 | 6/2001 | Ammicht et al. | |
| 6,279,017 B1 * | 8/2001 | Walker | ........... 715/529 |
| 6,526,382 B1 * | 2/2003 | Yuschik | ........... 704/275 |
| 6,574,595 B1 * | 6/2003 | Mitchell et al. | ........... 704/242 |
| 6,647,363 B1 * | 11/2003 | Claassen | ........... 704/1 |

* cited by examiner

*Primary Examiner*—W. R. Young
*Assistant Examiner*—Minerva Rivero
(74) *Attorney, Agent, or Firm*—Bromberg & Sunstein LLP

(57) ABSTRACT

A speech recognition system plays prompts to a user in order to obtain information from the user. If the user begins to speak, the prompt should stop. However, the system may receive sounds other than speech from the user while playing a prompt, in which case the prompt should continue. The system temporarily stops a prompt when it detects a sound or when it preliminarily determines that a detected sound may be a target sound (such as words from the user). The system then determines whether the received sound is a target sound or some other sound (such as coughing or a door shutting). If the received sound is not determined to be a target sound, then the prompt is resumed. The prompt can be resumed at any appropriate point, such as the point where it was stopped, a prior phrase boundary, or the beginning of the prompt.

22 Claims, 4 Drawing Sheets

Figure 4  "Please say your address, including zip code."

Figure 5  *"Please say your ad- [Barge-in Sound]"*

Figure 6  "Please say your ad- *[Barge-in Sound] [pause]* -dress, including zip code."

Figure 7  "Please say your ad- *[Barge-in Sound] [pause]* address, including zip code."

Figure 8  "Please say your ad- *[Barge-in Sound] [pause]* Please say your address, including zip code."

NON-TARGET BARGE-IN DETECTION

FIELD OF THE INVENTION

The invention relates to speech recognition and in particular to handling barge-in sounds in interactive voice recognition systems.

BACKGROUND OF THE INVENTION

Interactive Voice Recognition (IVR) systems interact with users by playing prompts and listening for responses from users. The systems attempt to recognize responses. Various actions can be performed in response to recognized speech.

While a speech recognition system is playing a prompt for a user, sounds may be received by the system. These sounds are known as barge-in sounds or simply barge-in and can be from a variety of both target sources and non-target sources. The target sources could be, for example, target speech sources, such as from the user that is interacting with the system. The non-target sources could be, for example, non-target speech (such as background speech from someone other than the user) or non-speech, such as the user making a noise such as coughing, a door shutting, and cars or other vehicles making traffic-related noises. These non-target sources may incorrectly be identified by the IVR system as an intended barge-in by the user, inhibiting the effectiveness of the IVR system.

SUMMARY OF THE INVENTION

Embodiments of the invention provide techniques for accommodating non-target barge-in sounds during operation of speech or other signal recognition applications. A prompt being played to a user of the application will be stopped or interrupted when sounds barge in and are detected by the speech recognition system. A recognizer then attempts to determine whether the sounds are target sounds (such as the user's voice) or non-target sounds. If the sounds are not recognized as target sounds, the application returns to the prompt being played to the user when the barge-in occurred. The prompt can resume at the exact spot where the prompt was interrupted or to another point in the prompt. For example, the application could return to the phrase boundary in the prompt nearest to and preceding the point where the prompt was interrupted, or to the beginning of the interrupted prompt.

BRIEF DESCRIPTION OF THE DRAWINGS

FIG. 4 is a diagram illustrating an example of a prompt to be played by the system shown in FIGS. 1–2.

FIG. 5 is a diagram of a portion of the prompt shown in FIG. 4 interrupted by a barge-in sound.

FIG. 6 is a diagram of an implementation of restarting the interrupted prompt shown in FIG. 5 from an interruption point of the interrupted prompt, according to an embodiment of the invention.

FIG. 7 is a diagram of an implementation of restarting the interrupted prompt shown in FIG. 5 from a phrase boundary preceding an interruption point of the interrupted prompt, according to another embodiment of the invention.

FIG. 8 is a diagram of an implementation of restarting the interrupted prompt shown in FIG. 5 from a beginning of the interrupted prompt, according to another embodiment of the invention.

DETAILED DESCRIPTION OF PREFERRED EMBODIMENTS

Figure 1:
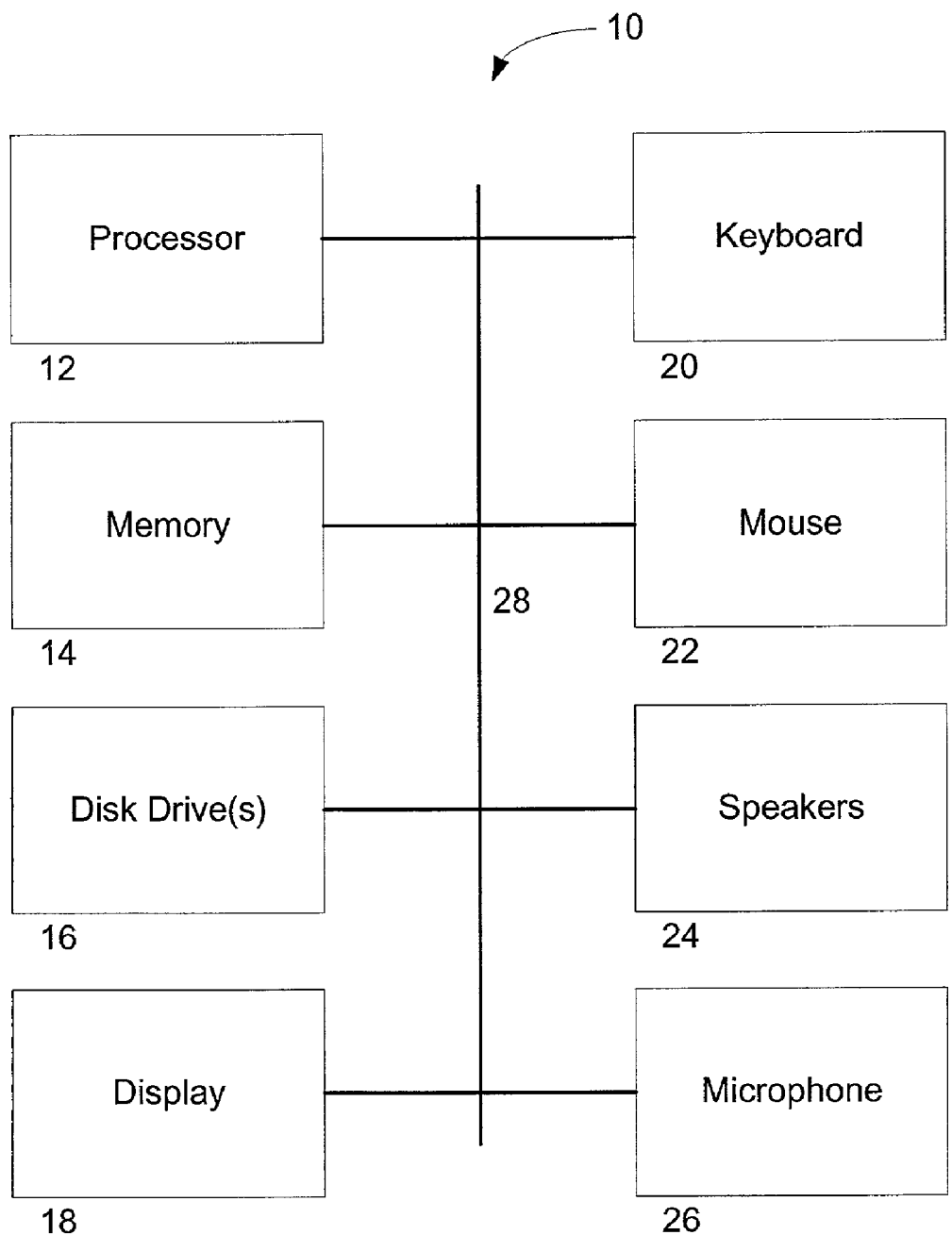
FIG. 1 is a simplified block diagram of a computer system for implementing a speech recognition system according to an embodiment of the invention.

As shown in FIG. 1, a computer system 10 according to a preferred embodiment includes a processor 12, memory 14, one or more disk drives 16, a display 18, a keyboard 20, a mouse 22, speakers 24, and a microphone 26. The processor 12 can be a personal computer central processing unit (CPU), using, for example, a Pentium III or Pentium 4 processor made by Intel Corporation. Memory 14 preferably includes random access memory (RAM) and read-only memory (ROM). The disk drives 16 can include, for example, floppy-disk drives, a hard-disk drive, a CD-ROM drive, and a Zip or other drive with removable disks (and which may or may not be rewritable). The display 18 may be a cathode-ray tube (CRT) or other form of display, such as a liquid-crystal display (LCD). The keyboard 20 and mouse 22 provide data input mechanisms for a user (not shown). The speakers 24 can produce audio output for the user and the microphone can receive sounds, e.g., speech from the user. The components of the computer system typically are connected by a bus 28. The computer system 10 can store, e.g., in memory 14 and/or on disk drives 16, software code containing instructions for controlling the processor 12 to perform functions described below. The functions implement a speech recognition system.

Figure 2:
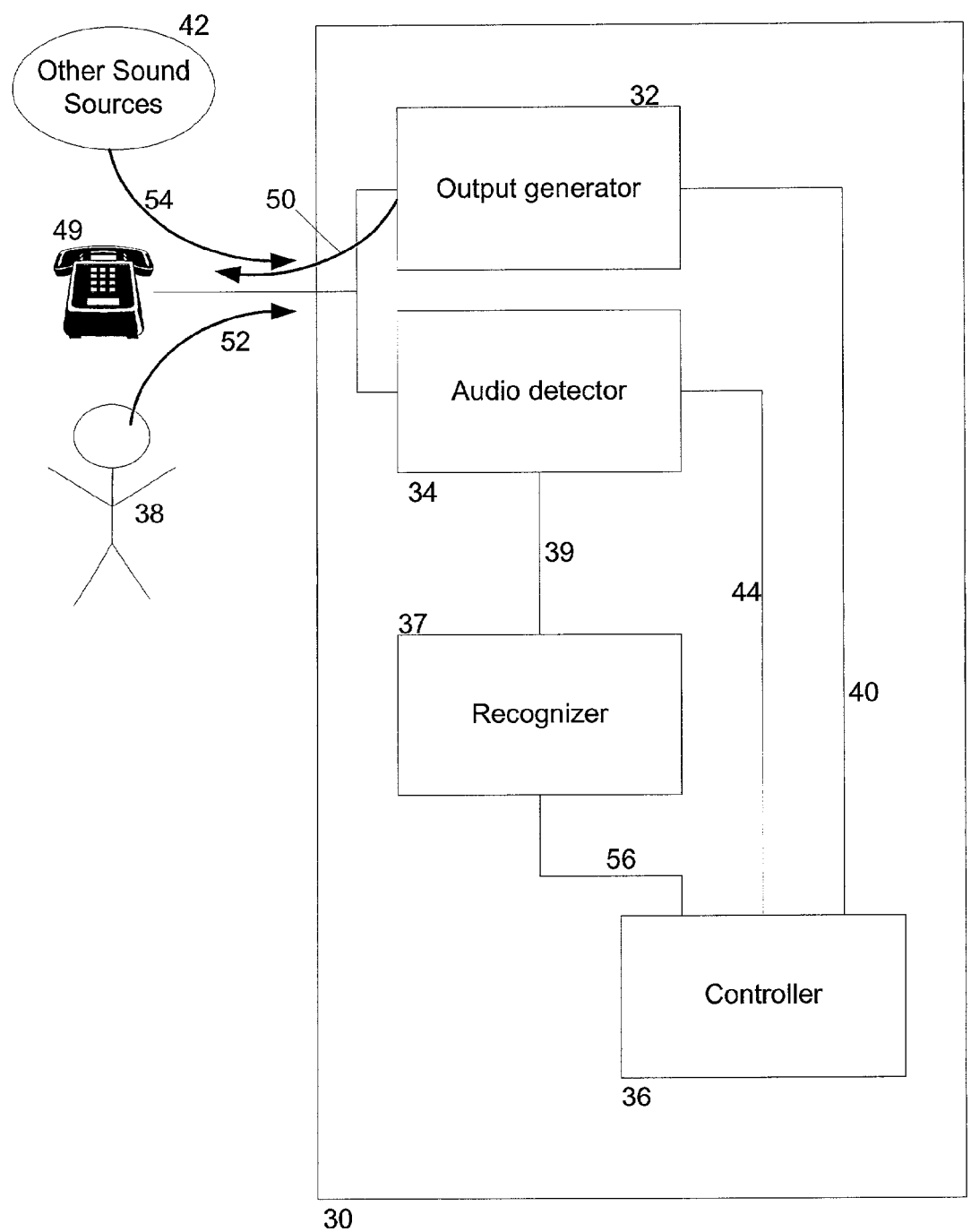
FIG. 2 is a schematic diagram of an interactive speech system according to an embodiment of the invention.

As shown in FIG. 2, speech recognition system 30 preferably includes an audio output generator 32, an audio detector 34, a control unit 36, and a recognizer 37 and is configured for sustaining interactive speech with a user 38 through a telephone 49. Although described below in terms of a control unit 36 and a recognizer 37, it should be understood that in speech recognition system 30, control unit 36 and recognizer 37 may be separate modules or may represent two functions provided by the same module.

In some embodiments, output generator 32 is implemented using a telephony line interface card, such as provided by Dialogic Corporation and files that contain the prompts. Those files can include, for example, text-based representations of the prompts, in which case output generator 32 also includes a text-to-speech function or application. Or, as another example, the files can include digital representations of the sounds that make up the prompt. Output generator 32 also can be implemented using signal processing hardware and/or software.

Output generator 32 provides signals representing audible indications 50, such as speech prompts, which are transmitted over the telephone line to telephone 49. Output generator 32 preferably is controlled by control unit 36, which connects to output generator 32 via line 40. In some embodiments, audio detector 34 is implemented using a line interface card (and may be included in the same line interface card as provides a portion of output generator 32) and is configured to receive sounds 52 from the user 38 and other sounds 54 from other sound sources 42, such as telephone ringers, doors, and traffic. In these embodiments, audio detector 34 receives sounds transmitted over the telephone line from telephone 49. Alternatively, audio detector 34 can be implemented using signal processing hardware and/or software.

Speech recognition system 30 also can interact with the user through non-telephone networks, or from microphone 26 to audio detector 34 and from audio output generator 32 to speakers 24.

Detector 34 can send an indication that a sound has been received to the control unit 36 via a line 44 and electrical signals representative of the sounds can be sent by the detector 34 to the recognizer 37 on a line 39. In a preferred embodiment, the electrical signals indicative of the sounds that detector 34 sends to recognizer 37 are digital signals even if detector 34 receives analog signals. Preferably, if detector 34 continues to receive signals indicative of sounds, detector 34 continues to send signals representative of those sounds to recognizer 37.

In some embodiments, recognizer 37 is a telephony-based speech recognizer, which may be bundled as part of a recognizer engine or implemented as a discrete module. Recognizer 37 can recognize, or at least attempt to recognize, speech or other target signals as indicated by the signals received from the audio detector 34. Recognizer 37 can provide indications on line 56 to control unit 36 as to the content or type of signal received. The received signal could be, for example, a target signal containing an instruction for an action to perform such as retrieving information or playing another prompt. When recognizer 37 determines that a target signal has been received, a separate content-analyzing module within the recognizer engine may be used to determine the content of the received signal, or recognizer 37 may itself determine the content and provide a signal representing the content of that target signal.

Or, recognizer 37 could determine that the sound received was a non-target signal. In one embodiment, recognizer 37 provides a signal that the sound received was a non-target signal if it does not recognize the signal as a target signal within a set period of time. Alternatively, recognizer 37 may provide a signal that the sound received was a non-target signal if it determines that the signal is a non-target signal. In one embodiment, recognizer 37 determines whether the sound received is a target or a non-target signal by obtaining a score for that signal, and determining whether the score exceeds a threshold for recognizing the signal as a target (or as a non-target) signal. Preferably, the score is obtained by tuning recognizer 37 to detect likely non-target sounds. The likely non-target sounds may vary depending on the conditions and environment in which the system is used, and depending on the particular recognition application.

Audio detector 34 may also include the ability to perform some initial analysis of the received sound, to determine whether the sound might represent a target signal. In this case, only received sounds that might represent target signals are sent to recognizer 37 and audio detector 34 only provides a signal to control unit 36 indicating that a sound has been received when the sound might represent a target signal. Recognizer 37 then performs a more extensive analysis or analyzes a longer portion of the received sound, which sound may continue after audio detector 34 has performed its initial analysis. This ability of audio detector 34 to perform some analysis may be provided in the line interface card, using for example a line interface card with voice activity detection, or as a separate hardware and/or software feature to provide short-term processing.

Control unit 36 preferably is implemented as part of the speech recognition platform or as part of the application software. Control unit 36 is configured to instruct and control audio output generator 32 and audio detector 34. Control unit 36 can instruct output generator 32 to play prompts 50 to user 38, such as in response to recognized speech. When detector 34 indicates via line 44 that a sound has been received by the detector 34 while the output generator is playing a prompt, control unit 34 preferably instructs output generator 32 to stop or interrupt playing the prompt. In response to an indication regarding the signal content from recognizer 37, control unit 34 can initiate and/or perform various actions. In response to an indication from the recognizer 37 that the received sound was a non-target signal (or not recognized as a target signal), control unit 36 can instruct audio output generator 32 to play at least a portion of the prompt that was playing when the sound was received by detector 34.

Control unit 36 preferably determines how much of an interrupted prompt to play to the user depending upon one or more predetermined criteria. In one configuration, control unit 36 can instruct the detector to replay the entire interrupted prompt from its beginning. Alternatively, control unit 36 can note an interruption point of a prompt corresponding to the point in the prompt that a sound is received by the detector 34. If it is determined to restart playing the interrupted prompt, the detector can instruct the output device to restart playing of the prompt from the interruption point. In yet another configuration, control unit 36 can instruct the output device 32 to restart playing the interrupted prompt from a phrase boundary (a pause or other natural break in a prompt) preceding the interruption point. The selected phrase boundary preferably is the last, or most recent, phrase boundary in the interrupted prompt before the interruption point. The control unit can be configured always to restart the interrupted prompt using the same restart algorithm (e.g., always from the beginning of the prompt or always from the interruption point or always from a phrase boundary preceding the interruption point) or the control unit may be configured to allow for changes to where an interrupted prompt is restarted. For example, if the interruption point is within a specified amount of time from when the prompt began, the control unit could restart the interrupted prompt from the beginning; but, if the interruption point was after the specified time, the control unit could restart the interrupted prompt from the phrase boundary preceding the interruption point. Also, control unit 36 can be configured to restart different prompts or different types of prompts using different restart algorithms.

In operation, the system 30 interacts with the user 38 to converse with the user 38 in a natural manner in the presence of non-speech sounds interrupting prompts, to facilitate conversations with the user 38, especially to help ensure understandable presentation of prompts. An example is provided with respect to FIGS. 4–8 of a portion of an interactive conversation where the system 30 prompts the user 38 for the user's address.

Figure 3:
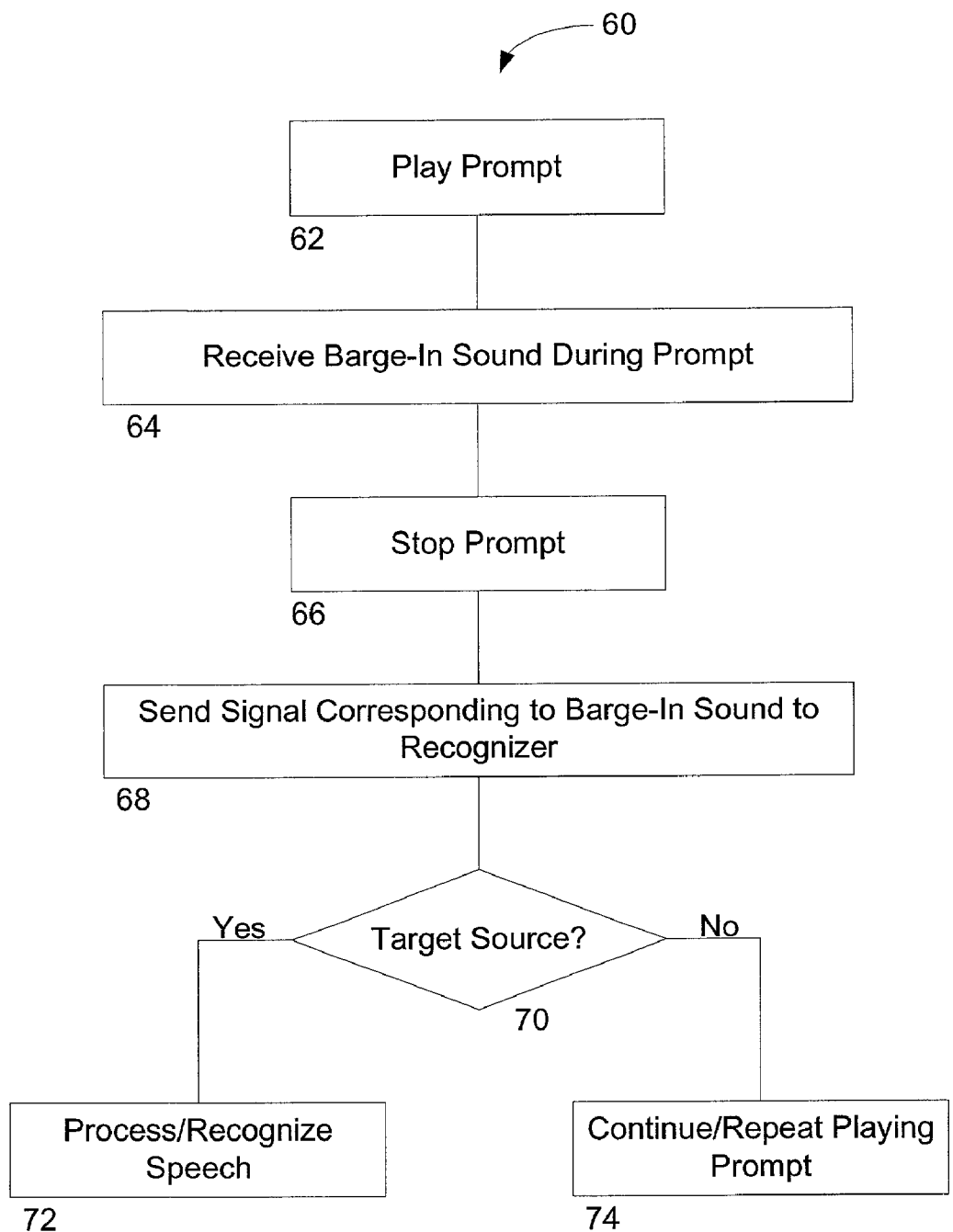
FIG. 3 is a flow diagram of an interactive speech process according to an embodiment of the invention.

As illustrated in FIGS. 2 and 3, a process 60 of interacting with a user with speech includes block 62, in which the system 30 plays a prompt for user 38. Control unit 36 instructs the output generator 32, which provides a prompt for user 38. Referring also to FIG. 4, in this example output generator 32 begins playing the prompt, "Please say your address, including zip code."

At block 64, during the playing of the prompt by output generator 32, detector 34 receives a barge-in sound. The detector sends an indication to the control unit 36 that a sound has been received. In response to this indication, control unit 36 instructs the output generator 32 to stop playing the prompt, at block 66. Alternatively, detector 34 can cause interruption of further output of the prompt when the detector receives the sound by blocking communication of the prompt from output generator 32 to the user. In some configurations, such as if detector 34 is close to the user but not to output generator 32, this alternative can lead to less delay between the time the sound is detected and the time the user stops hearing the prompt.

As shown in FIG. 5, the prompt in this example is stopped after, "Please say your ad-" has been played. The interruption point of the prompt is thus between "ad" and "dress." An indication of the received sound is sent from detector 34 to recognizer 37, as shown in block 68.

At block 70, an inquiry is made as to whether the received barge-in sound is from a target source or a non-target source. This may be determined immediately, or may involve reviewing additional or subsequent portions of the received signal. If recognizer 37 determines that the received barge-in sound is from a target source, the signal is processed, at block 72. For example, if the signal is from the target source and is recognized (e.g., spoken words are identified), the recognition system may take some action in response. Or, if the signal is not recognized (e.g., the sound is from the user but the words spoken are not understood), the recognition system may play another prompt.

If, as shown in block 74, recognizer 37 determines that the received barge-in sound is from a non-target source, such as a cough or a door shutting, or recognizer 37 does not determine within a time limit that the barge-in sound is from a target source, recognizer 37 sends an indication of this determination to control unit 36. Control unit 36 then instructs the output generator 32 to resume playing the prompt. As shown in FIG. 6, if the control unit 36 is configured to restart the prompt from the interruption point, then output generator 32 provides the prompt, "-dress, including zip code" (so that the complete prompt is "Please say your ad-[pause]-dress, including zip code"). As shown in FIG. 7, if control unit 36 is configured to restart the prompt from the phrase boundary immediately preceding the interruption point, then output generator 32 provides the prompt, ". . . address including zip code" (so that the complete prompt is "Please say your ad-[pause] address, including zip code"). As shown in FIG. 8, if control unit 36 is configured to replay the prompt in its entirety, then output generator 32 provides the prompt "Please say your address, including zip code" (so that the complete prompt is "Please say your ad-[pause] Please say your address, including zip code").

Other embodiments are within the scope and spirit of the appended claims. For example, the control unit 36 can be configured to instruct output generator 32 to restart an interrupted prompt from a phrase boundary other than the one immediately prior to the interruption point, such as an earlier phrase boundary, or a phrase boundary after the interruption point. The control unit 36 can also be configured to instruct output generator 32 to restart playing the interrupted prompt at a point in the prompt that may not be a phrase boundary, such as a predetermined amount of time before the interruption point. The ability to restart prompts interrupted by non-speech sounds can be an integrated part of an overall speech recognition system, such as a software package. Or, this feature could be provided as part of an add-on to a software package, such as in a DialogModule-format, DialogModules being available from SpeechWorks International, Inc. of Boston, Mass.

What is claimed is:

1. A speech recognition system comprising:
    an output device configured to play a speech prompt to a user of the system, the speech prompt conveying information to the user or prompting the user for speech input;
    a detector configured to receive a sound signal indicative of a possible target sound and to output a signal representative of the sound signal and a signal indicating receipt of the sound signal, so as to permit interruption of further output of the prompt if the detector receives the sound signal while the output device is playing the prompt;
    a recognizer coupled to the detector, the recognizer being configured to receive the signal representative of the sound signal and to output a recognizer signal indicative of whether the sound signal is a target sound; and
    a control unit coupled to the output device, the detector, and the recognizer, the control unit being configured to receive the recognizer signal and, if the detector received the sound signal while the output device was playing a prompt and the recognizer signal indicates that the sound signal is other than a target sound, to cause the output device to play at least a portion of the prompt being played by the output device when the sound signal was received by the detector.

2. The system of claim 1 wherein the control unit is configured to cause the output device to replay the prompt that was being played when the sound was received by the detector from a beginning of the prompt.

3. The system of claim 1 wherein the control unit is configured to cause the output device to replay the prompt that was being played when the sound was received by the detector from a phrase boundary preceding a point at which further output of the prompt was interrupted.

4. The system of claim 3 wherein the phrase boundary is a last phrase boundary preceding the point at which further output of the prompt was interrupted.

5. The system of claim 1 wherein the control unit is configured to cause the output device to play the prompt that was being played when the sound was received by the detector beginning from a point at which further output of the prompt was interrupted.

6. The system of claim 1 wherein the control unit is configured to cause the output device to play the prompt that was being played when the sound was received by the detector using a restart algorithm dependent on a point at which further output of the prompt was interrupted.

7. The system of claim 1 wherein the control unit is configured to cause the output device to play the prompt that was being played when the sound was received by the detector using a restart algorithm dependent on the prompt.

8. The system of claim 1 further comprising a content analyzer configured to process the signal representative of the sound signal if the sound signal is determined to be a target sound indicative of speech.

9. The system of claim 8 wherein the content analyzer is configured to attempt to recognize the speech to which the target sound is indicative.

10. The system of claim 1 wherein the control unit is configured to cause the output device to interrupt playing the prompt if the detector receives the sound while the output device is playing the prompt.

11. A computer program product, residing on a computer-readable medium, for use in a speech recognition application configured to play prompts to a user of the application and to receive signals indicative of sounds, the speech recognition application being configured to interrupt at an interruption point a prompt being played when a sound is received by the application, the computer program product comprising instructions for causing a computer to:

determine whether a signal indicative of a sound received by the speech recognition application while a prompt is being played is indicative of a target sound; and cause the speech recognition application to play at least a portion of the prompt being played by the output device when the sound that was received by the speech recognition application is determined to be indicative of a non-target sound.

12. The computer program product of claim 11 wherein the instructions for causing a computer to cause the speech recognition application to play at least a portion of the prompt include instructions for causing the computer to cause the speech recognition application to replay the prompt that was being played when the signal indicative of a sound was received by the application from a beginning of the prompt.

13. The computer program product of claim 11 wherein the instructions for causing a computer to cause the speech recognition application to play at least a portion of the prompt include instructions for causing the computer to cause the speech recognition application to replay the prompt that was being played when the signal indicative of a sound was received by the application beginning from a phrase boundary preceding the interruption point.

14. The computer program product of claim 13 wherein the phrase boundary is a last phrase boundary preceding the interruption point.

15. The computer program product of claim 11 wherein the instructions for causing a computer to cause the speech recognition application to play at least a portion of the prompt include instructions for causing the computer to cause the speech recognition application to play the prompt that was being played when the signal indicative of a sound was received by the application beginning from the interruption point.

16. An interactive speech method comprising:
playing a prompt to a user; detecting a signal indicative of a sound;
in response to detecting the signal indicative of a sound, interrupting the playing of the prompt at an interruption point of the prompt;
determining whether the detected signal is indicative of a target sound; and
resuming play of at least a portion of the prompt in response to determining that the detected signal is indicative of a non-target sound.

17. The method of claim 16 wherein the step of resuming play includes restarting the prompt from its beginning.

18. The method of claim 16 wherein the step of resuming play includes restarting the prompt from a phrase boundary preceding the interruption point.

19. The method of claim 18 wherein the phrase boundary is a phrase boundary immediately preceding the interruption point.

20. The method of claim 16 wherein the step of resuming play includes restarting the prompt from the interruption point.

21. A speech recognition system comprising:
an output device configured to play speech prompts to a user of the system, the speech prompts conveying information to the user or prompting the user for speech input;
a detector configured to receive a signal indicative of a possible target sound and to output a signal representative of the sound; and
a control unit, coupled to the output device and the detector, programmed to stop the output device from playing the prompt if the detector receives the signal indicative of a possible target sound while the output device is playing the prompt, and to cause the output device to resume playing the prompt if the sound is determined to be a non-target sound.

22. The system of claim 21 further comprising a recognizer coupled to the detector and the control unit, the recognizer being configured to determine whether the sound received by the detector is a target sound.

* * * * *